Aug. 15, 1961     C. B. KREKELER     2,996,291
CUTTER BIT AND SOCKET STRUCTURES

Filed May 16, 1957     2 Sheets-Sheet 1

INVENTOR.
CLAUDE B. KREKELER,
BY Allen & Allen
ATTORNEYS.

Aug. 15, 1961 C. B. KREKELER 2,996,291
CUTTER BIT AND SOCKET STRUCTURES
Filed May 16, 1957 2 Sheets-Sheet 2
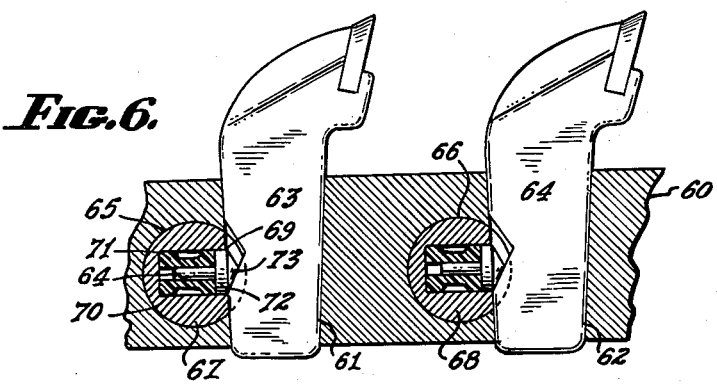
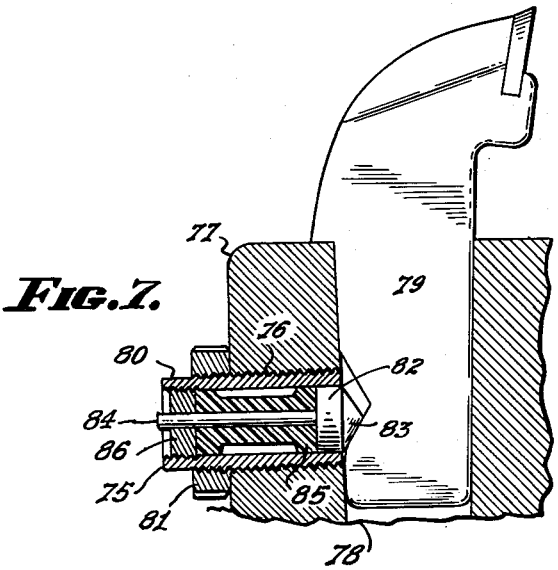
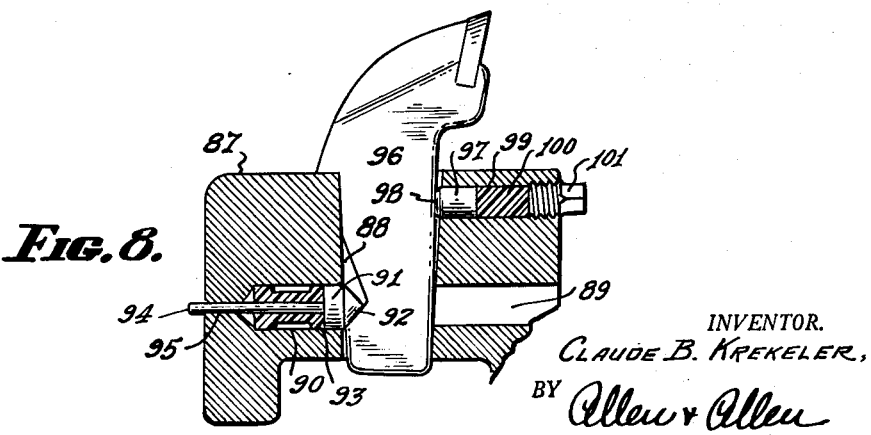
INVENTOR.
CLAUDE B. KREKELER,
BY Allen & Allen
ATTORNEYS.

United States Patent Office 2,996,291
Patented Aug. 15, 1961

2,996,291
CUTTER BIT AND SOCKET STRUCTURES
Claude B. Krekeler, Cincinnati, Ohio, assignor to The Cincinnati Mine Machinery Co., Cincinnati, Ohio, a corporation of Ohio
Filed May 16, 1957, Ser. No. 659,562
10 Claims. (Cl. 262—33)

The invention relates to cutter bits and holders therefor such as are used in mining machinery. In such structures, powered heads or chains are provided with members having recesses or perforations forming sockets for the reception of the shanks of cutter bits or cutter bit holders. Various means have been employed to hold the shanks in the socket members, including the use of set screws. It will be understood that the bits of mining machinery, as well as the heads or chain elements having the socket members, are subjected to very great stresses during the cutting operation and also to excessive vibration. Again, in many operations, the structures are subjected to corrosive mine waters as well as to excessive wear. Moreover, the bits require relatively frequent renewal, and this operation must be kept simple.

It is a primary object of this invention to provide an improved means for retaining the shanks of cutter bits or cutter bit holders in the socket members of chains, heads, and the like.

It is an object of the invention to provide means for this purpose which is simple in construction, not likely to get out of repair, and readily renewable.

It is an object of the invention to provide a structure in which the shank of a cutter bit or cutter bit holder can be engaged and securely held in cutting position by merely driving the shank into the perforation of a socket member; and it is a concurrent object of the invention to provide a structure such that the bit or bit holder may be readily withdrawn from the socket member by a simple prying or dislodging operation, for replacement or repair.

It is an object of the invention to provide in connection with a cutter bit or holder means for drawing the shank downwardly into the socket, not only to hold it in place securely, but also to establish gauge in connection with a wedge fit or an abutment means as desired.

It is an object of the invention to provide a structure for the purpose described which does not involve a significant weakening of the shank and at the same time solidly retains the shank in the socket member with abutment against solid surfaces to withstand the cutting stresses.

These and other objects of the invention, which will be set forth hereinafter or will be apparent to one skilled in the art upon reading these specifications, are accomplished by that construction and arrangement of parts of which certain exemplary embodiments will now be described. Reference is made to the accompanying drawings wherein:

FIG. 6 is a partial view of a head member in section with a plurality of cutter bits engaged therein, and illustrating a different mode of constructing the bit engaging means.

FIG. 7 is a similar view showing a modified form of the bit engaging means.

FIG. 8 is a similar view showing a construction in which both edges of the bit are held against abutment surfaces for withstanding the cutting stresses by resilient engaging means.

It has hitherto been suggested to form the shanks of cutter bits or cutter bit holders with a slight taper and to provide a similar configuration in the perforation of the socket member. Under these circumstances a bit or bit holder can be installed in the mining machine by starting its shank into the perforation of the socket member and driving it home. The bit is held essentially by the wedging action. Some success has been attained with such structures; but bits which are simply wedged in place tend to be loosened by excessive vibration. Also, the corrosive action of mine waters tends to impair the engagement; and it will be evident also that for solid engagement the engaging surfaces both of the shank and of the perforations in the socket member require considerable accuracy in manufacture.

Briefly, in the practice of this invention, the perforated socket member is provided with a resiliently actuated means extending into the perforation but displaceable therefrom. This resiliently actuated means comprises a metallic element having a tapered, rounded or conical head and resiliently mounted as hereinafter explained. The shank of the cutter bit or cutter bit holder is provided with a notch, the side of which toward the end of the shank is beveled with an angularity substantially equivalent to that of the head of the resilient means. The head of the resilient means engages in this notch and by reason of the coaction of the meeting surfaces, there is a continuous tendency for the shank to be drawn downwardly into the socket.

Figure 1:
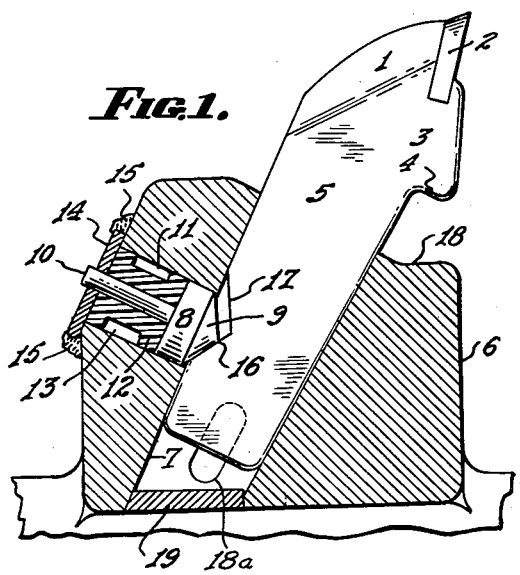
FIG. 1 is a partial sectional view of a cutter bit and socket member embodying the invention and in which the shank has a wedge fit in the socket.

The embodiment of such a structure is illustrated in FIG. 1 where there is shown a cutter bit having a head 1 usually equipped with a hard cutting insert 2 of Carboloy or tungsten carbide welded or brazed in position. The head has a forward extension 3 with a downwardly directed shoulder 4. The bit also has a shank 5. In the particular embodiment this shank is tapered or given a wedge shape. The exact angularity may be varied but is ordinarily of the order of about 4° to 10°. The socket member 6 is provided with a perforation 7 having a similarly tapered shape.

Figure 2:
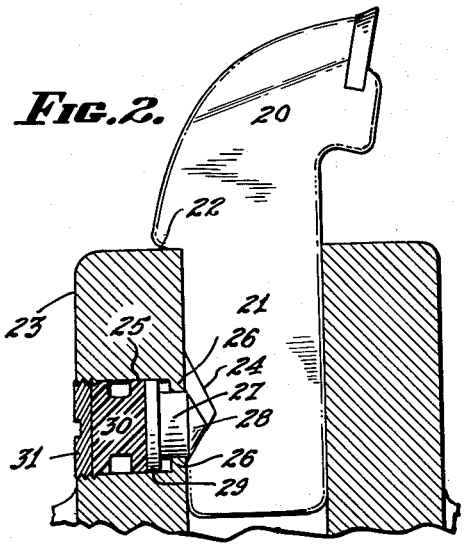
FIG. 2 is a similar illustration of a modification in which the shank is straight and engages in a non-tapered orifice.
Figure 3:
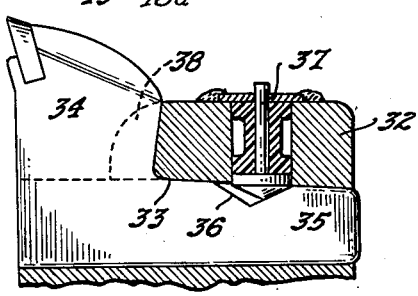
FIG. 3 is a similar illustration of a modified structure having a shank which engages in the socket member in a horizontal direction.

In the particular embodiment, the perforation in the socket member lies aslant both to the vertical and horizontal axes of the socket member. This is an exemplary modification only since, as illustrated in FIG. 2, the shank may lie vertically in the socket member or, as illustrated in FIG. 3, it may lie horizontally therein.

FIG. 1 shows a resilient means for holding the shank comprising a head 8 having a conical nose 9 and a rearwardly extending shaft-like member 10. This member operates in a perforation 11 in the socket member transverse the perforation 7. Behind the head 8 there is located a resilient means 12. This may be a spring or other mechanical device, but is conveniently a cylindrical element of resilient composition such as rubber or neoprene. It is perforated to accept the shaft-like member 10 and may be provided with an annular groove or recess to facilitate compressibility. The structure is held in place in this instance by a washer-shaped metallic element 14, perforated to receive the shaft 10 and welded to the socket member as at 15. If desired, the projecting end of the shaft 10 may be headed, although this is not ordinarily necessary.

The shank 5 of the cutter bit is provided with a notch for coaction with the nose 9. This notch has a lower surface 16 which has an angularity substantially that of the nose 9. The upper edge 17 of the notch has a shape such as to avoid the head. The surface 16 is longer than the corresponding surface of the nose 9.

In use, the shank of the cutter bit is inserted in the perforation 7 of the socket member 6 and the bit or bit holder is driven home by pressure or by blows from a suitable instrument. The end of the shank 5 can pass the resilient means by pushing it inwardly with concurrent compression of the resilient means 12. When the end of the shank has passed, however, the nose 9 engages in the notch 16, 17. It will be evident that the action of the structure will be to draw the shank downwardly or inwardly in the socket member, preventing loosening and compensating for wear and corrosion. When it is desired to withdraw the bit or bit holder from the socket member, this can be accomplished by inserting a prying tool or bar between the shoulder 4 of the bit and a corresponding surface 18 of the socket member, and prying the bit out. The bit can also be withdrawn by driving a drift pin into a hole in the socket member indicated at 18a, especially if the bit head should be broken off. The hole 18a can act as a bleed hole for cuttings. During this operation the resilient means will again be depressed into the opening 11. In the particular embodiment the socket member perforation 7 is shown as closed at the bottom by a member 19 to deter cuttings from entering the socket member perforation and exerting pressure on the end of the shank of the cutter bit.

While it is preferred to employ a tapered shank in a tapered orifice, the invention is not so restricted. In FIG. 2 there is shown a cutter bit having a head 20 and a straight or non-tapered shank 21. In this instance the head is provided with a rear abutment 22 for engaging the top surface of the socket member 23 and not only establishing gauge but withstanding some at least of the cutting stresses. The shank 21 is provided with the notch 24.

A somewhat modified resilient means is indicated in this figure. The socket member is provided with a transverse perforation 25 having shoulders 26 at its inner end. The bit engaging means has a head 27, a conical nose 28, and a flange 29 lying behind the shoulders 26; but it does not have a shaft. The resilient means is indicated at 30, and in this instance it is held in position in the perforation 25 by a threaded disc 31.

The operation of the structure of FIG. 2 will be clear from the explanation given above. The straight shank of the cutter bit should have a reasonably snug fit in the perforation of the socket member 23; but it may be noted that the resilient means keeps the lower end of the shank pressed forwardly so that the rearward and downward cutting strains are withstood by the engagement of the lower end of the shank with the front side of the socket member perforation and by the engagement of the member 22 with the top of the socket member.

In FIG. 3 there is shown a modification in which the socket member 32 has a substantially horizontal perforation 33, the bit having a head 34 and a horizontally disposed shank 35. The shank has the notch 36; and the resilient means indicated generally at 37 is the same in structure as has been described in connection with FIG. 1.

In most usages the shanks of the cutter bits or cutter bit holders will be rectangular in cross-section, which will prevent turning of the cutter bits in the sockets. Other shapes may be similarly employed. The shanks may even be circular in cross-section providing some means is adopted to prevent turning. Such means may include expedients like keys and keyways, but may also include extensions such as the extension 38 in FIG. 3 which engage lateral portions of the bit head to prevent turning. While the configurations 36, 24 and the like have been referred to hereinabove as "notches," it will be understood that they can be in the form of conical depressions such as are easily produced by a milling operation. It may be noted that in the structure of FIG. 3 gauge is established by the lower lateral edge portion of the shank and head and is not dependent on the extent to which the shank engages in the socket member.

Figure 4:
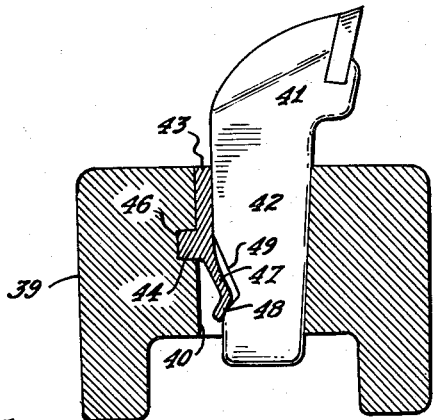
FIG. 4 is a similar view showing a modification of the bit engaging means.

The resilient means hereinabove referred to may take various forms. In FIG. 4 there is shown a structure including a socket member 39 having a perforation 40 and a bit having a head 41 and a shank 42. In this instance a wholly metallic resilient means is employed. This resilient means comprises a base member 43 adapted to lie within the perforation, and having a rearward extension 44 adapted to lie within a correspondingly shaped recess 46 in the socket member. This engagement prevents upward or downward movement as well as lateral movement of the base. The base has a resilient tongue or extension 47 with an inwardly turned end 48 which engages in the notch 49 of the shank 42 and acts to urge the shank downwardly as previously described. The shank 42 may be tapered or straight-sided as described. It will be noted that the upper rear edge of the shank will bottom against the base 43, while the lower front edge of the shank will bottom against the front edge of the perforation in the socket member.

The member comprising the base 43, rearward extension 44, and tongue 47, 48 may be varied as to construction and fastened in place in different ways including, for example, through the use of bolts or rivets. However, in the structure shown the resilient member is readily renewable and replaceable should it become damaged by fatigue or through the action of corrosive mine waters. Thus, a used resilient member may be readily removed, and a new one inserted just prior to the insertion and driving home of the bit shank.

Figure 5:
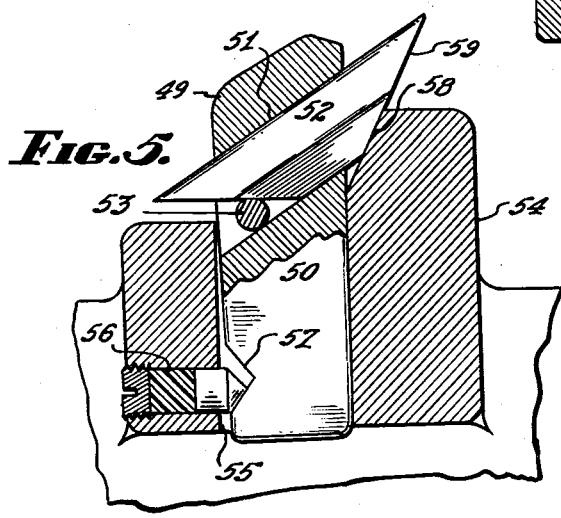
FIG. 5 is a similar view showing the use of a bit holder with a removable double-ended cutting bit.

FIG. 5 illustrates an embodiment employing a bit holder and a replaceable double-ended cutting bit. The bit holder has a head 49 and a shank 50. The head has a transverse diagonal perforation 51 to receive the body of a replaceable cutter bit 52 which bottoms on a transverse rod 53 in the bit holder. The socket member 54 has the usual shank-receiving perforation 55 and is provided with resilient means generally indicated at 56, which may be as shown or of the types specifically described in connection with FIGS. 1 and 2. The shank 50 has the notch 57 coacting with the resilient means as above set forth. The socket member 54 has a diagonally disposed face 58 which coacts with the front face 59 of the renewable bit 52 to hold the bit in the perforation of the bit holder and to establish gauge. The bit has been illustrated as a trapezoidal bit of a type well known in the mining machine art and not requiring description here. Other types of bits may be employed, such as rhomboidal double-ended bits with appropriate changes in the shape of the head of the bit holder, all as will be readily understood by the skilled worker in the art.

In some types of mining machinery, particularly those employing cutting arms or cutting heads as distinguished from chains, it may be found desirable to mount a plurality of cutter bits closely adjacent each other. Under these circumstances it may not be possible to provide perforations extending entirely through the socket member (head or arm) for the mounting of resilient structures such as have been described in connection with FIGS. 1, 2, 3 and 5. Another way of mounting resilient means under these circumstances is illustrated in FIG. 6. Here a head is partially shown at 60. This head has perforations 61 and 62 for receiving the shanks 63 and 64 of a plurality of cutter bits, of which there may be any number. The head is provided with transverse bores 65 and 66 which only partially intersect the perforations 61 and 62. Plug-like elements 67 and 68 carry the resilient means and are insertable in these bores. The plug-like elements are flattened on one side as shown at 69 and have a central bore 70 extending inwardly from the flatttened side. This bore need not extend entirely through the plug. The bore will contain the resilient substance 71 and a metallic element comprising a head 72, a conical nose 73, and a shaft 74 received within the resilient substance. The resilient substance may be so dimensioned that it will be received tightly within the depression 70 of the plug and will engage the shaft 74 so as to prevent dislodgment of the parts. The plugs 67 and 68, after insertion in the bores and proper positioning with respect to the perforations 61, 62, may be held in place in any way desired, as by screws, bolts, rivets, or welding, or brazing at the meeting edges.

Yet another modification of a resilient means is shown in FIG. 7. Here the resilient means is built into a threaded member 75 which is adjustably mounted in a threaded perforation 76 of a socket member 77 having the main perforation 78 for the reception of the bit shank 79. The threaded member 75 is provided with a head 80 which is shaped so as to be engageable by a wrench or other turning tool. A lock nut 81 may be provided for the threaded member. The bit shank engaging means, consisting of the head 82, the conical nose 83, and the shaft 84, is mounted in the hollow interior of the threaded member 75. The resilient substance 85 lies behind it and may be held in place by a threaded perforated element 86 or otherwise as desired. This structure gives some opportunity for adjustment of the resilient means and also makes it readily renewable, as will be apparent. The member 75 may be otherwise engaged in the perforation 76, as by a breech lock, or similar means.

Yet another modification is shown in FIG. 8 where the socket member 87 having the socket forming perforation has been drilled inwardly from the front side as shown at 89 so as to provide a recess 90 on the rear side of the socket perforation. The bit engaging means having the head 91 and conical nose 92 lies in the recess 90 with the resilient material 93 behind it. The shaft member 94 of the bit engaging means extends through a smaller perforation 95 along the axis of the recess 90.

In this particular embodiment means have been shown to keep the upper portion of the bit shank 96 back against the rear wall of the socket forming perforation 88. This means may comprise a head 97 having a rounded nose 98 lying in a transverse perforation 99 in the socket member. The head is backed by a resilient means 100 held in place by a set screw 101 threaded into the bore 99, or by other suitable means. The lower resilient means in the figure keeps the lower end of the bit shank forward against the front surface of the perforation 88.

Modifications may be made in the invention without departing from the spirit of it. It will be understood that the resiliently actuated means may engage the shanks either on the sides or ends as desired. Having thus described the invention in various exemplary embodiments, what is claimed as new and desired to be secured by Letters Patent is:

1. In a socket member having a perforation to receive the shank of a cutting element, said socket member also having a hole meeting and connecting with said perforation, a resiliently acting engagement member operating partly within said hole and partly within said perforation, and a body of resilient substance located within said hole and displaceable by said engagement member, said body of resilient substance having at least one end portion lying toward the intersection of said hole and said perforation and shaped to close said hole to minimize entrance into said hole of corrosive mine waters and fine cuttings.

2. The structure claimed in claim 1 including a cutting element, said cutting element having a head integral with a shank, and means in connection with said head for retaining a removable cutter bit, a face of said cutter bit coacting with a face of said socket member to retain said cutter bit in said holding member.

3. The structure claimed in claim 1 wherein said hole, said resiliently acting engagement member, and said body of resilient substance are located in a plug of cylindrical conformation insertable in a cylindrical bore in said socket member, which bore partially intersects said perforation and extends transversely of said socket member.

4. The structure claimed in claim 1 wherein said resiliently acting engagement member and said body of resilient substance are located in a metallic sleeve, said sleeve having a threaded engagement within said hole.

5. The structure claimed in claim 1 wherein said resiliently acting engagement member comprises a head with an operating nose and a rearwardly extending shaft, wherein said body of resilient substance surrounds said shaft, and including means apertured to receive said shaft and fixed in position with respect to said socket member for retaining said resiliently acting engagement member and said body of resilient substance within said hole.

6. The structure claimed in claim 5 wherein said resiliently acting engagement member, said body of resilient substance, and said retaining means are built into a separate plug insertable in said hole in said socket member.

7. The structure claimed in claim 6 in which said plug is externally threaded, said hole being correspondingly internally threaded.

8. The structure claimed in claim 5 wherein the operating nose of said resiliently acting engagement member engages in a notch in the lower rear portion of said shank, there being in said socket member a second hole meeting and connecting with said perforation, a second resiliently acting engagement member and a second body of resilient substance being located within said second hole, said second hole being so positioned that said second resiliently acting engagement member will engage a front portion of said shank near the upper end thereof.

9. In combination, a cutting bit having a shank substantially rectangular in cross-section with a forward and rear edge, and a socket member having a perforation of rectangular cross-section to receive said shank, there being a hole in said socket member intersecting said perforation, an engagement element in said hole having a nose extending into said perforation, and a backing of resilient rubbery substance in said hole displaceable by said engagement element and so shaped at its end toward the intersection of said hole and said perforation as to fill said hole in all positions of said engagement element, whereby to minimize entrance of corrosive mine waters and fine cuttings into said hole, said engagement element being so located with respect to said perforation that said nose will extend into said perforation at a lower portion of the rear edge thereof, the said shank having in its rear edge at the said point of engagement an operating surface lying aslant to the axis of said shank, whereby said engagement element acts to draw said shank inwardly of said perforation, and means acting to limit the entrance of said shank into said perforation.

10. The structure claimed in claim 9 wherein said engagement element and said backing of resilient rubbery substance are located within a sleeve having a threaded engagement in said hole.

References Cited in the file of this patent

UNITED STATES PATENTS

| | | |
|---|---|---|
| 994,804 | Wahlstrom | June 13, 1911 |
| 1,314,044 | Buker | Aug. 26, 1919 |
| 1,375,638 | Kienzle | Apr. 19, 1921 |
| 1,430,669 | Morgan | Oct. 3, 1922 |
| 1,862,623 | Harrington | June 14, 1932 |
| 2,063,128 | Severson | Dec. 8, 1936 |
| 2,156,726 | Fulke | May 2, 1939 |
| 2,168,794 | Fulke | Aug. 8, 1939 |
| 2,644,679 | Simmons | July 7, 1953 |
| 2,743,917 | Krekeler et al. | May 1, 1956 |
| 2,747,852 | Krekeler | May 29, 1956 |
| 2,766,029 | Bruestle | Oct. 5, 1956 |
| 2,798,715 | Brown | July 9, 1957 |
| 2,907,559 | Brown et al. | Oct. 6, 1959 |